(12) United States Patent
Gerlach

(10) Patent No.: US 9,895,825 B2
(45) Date of Patent: Feb. 20, 2018

(54) ABRASIVE SAW CHAIN

(71) Applicant: BLOUNT, INC., Portland, OR (US)

(72) Inventor: Todd Gerlach, Tualatin, OR (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 15/373,297

(22) Filed: Dec. 8, 2016

(65) Prior Publication Data

US 2017/0157798 A1 Jun. 8, 2017

Related U.S. Application Data

(60) Provisional application No. 62/264,783, filed on Dec. 8, 2015.

(51) Int. Cl.
B28D 1/08 (2006.01)
B23D 61/18 (2006.01)
B27B 33/14 (2006.01)

(52) U.S. Cl.
CPC .............. *B28D 1/082* (2013.01); *B23D 61/18* (2013.01); *B27B 33/14* (2013.01)

(58) Field of Classification Search
CPC .......... B28D 1/08; B28D 1/082; B28D 1/086; B23D 61/18; B27B 33/14
USPC ........................................................ 125/21
See application file for complete search history.

(56) References Cited

U.S. PATENT DOCUMENTS

| 4,037,403 A | 7/1977 | Lanz et al. |
| 4,426,900 A | 1/1984 | Lemery |
| 4,460,072 A | 7/1984 | Moerner et al. |
| 4,643,065 A * | 2/1987 | MacGavin ............ B27B 33/141 83/830 |
| 4,970,789 A * | 11/1990 | Bell ........................ B27B 17/04 30/384 |
| 5,136,783 A | 8/1992 | Bell |
| 5,215,072 A | 6/1993 | Scott |
| 6,374,716 B1 * | 4/2002 | Weber ..................... B27B 33/14 83/830 |
| 8,006,598 B2 | 8/2011 | Goettel et al. |
| 8,256,335 B1 | 9/2012 | Canon |
| 8,863,629 B2 | 10/2014 | Yancey et al. |
| 2007/0089586 A1 * | 4/2007 | Harfst ..................... B27B 33/14 83/830 |
| 2007/0151430 A1 | 7/2007 | MacLennan et al. |

(Continued)

FOREIGN PATENT DOCUMENTS

| CN | 2059861 U | 8/1990 |
| JP | 2985925 | 12/1999 |

*Primary Examiner* — Eileen Morgan
(74) *Attorney, Agent, or Firm* — Schwabe Williamson & Wyatt, P.C.

(57) ABSTRACT

Embodiments herein provide an abrasive saw chain that includes drive links and tie straps coupled to one another. Cutting elements, such as diamond cutting elements, may be coupled to upper surfaces of respective drive links. An upper surface of the tie strap may contact a lower surface of a cutting element to provide support for the cutting element. The tie strap may include a limiting feature to contact front and/or back surfaces of adjacent cutting elements when the links traverse an elongate portion of a guide bar. Alternatively, or additionally, the drive links may include a mating surface that contacts a mating surface of an adjacent drive link when the drive links traverse the elongate portion of the guide bar. Other embodiments may be described and/or claimed.

16 Claims, 15 Drawing Sheets

(56) References Cited

U.S. PATENT DOCUMENTS

| | | |
|---|---|---|
| 2007/0169598 A1 | 7/2007 | Szymanski |
| 2008/0110317 A1 | 5/2008 | Osborne et al. |
| 2010/0005666 A1* | 1/2010 | Seigneur ............... B27B 33/141 30/138 |
| 2010/0206286 A1 | 8/2010 | Michelon |
| 2012/0222313 A1* | 9/2012 | Seigneur .............. B23D 63/168 30/138 |
| 2013/0112057 A1 | 5/2013 | Osborne et al. |
| 2013/0269673 A1 | 10/2013 | Buchholtz et al. |
| 2016/0136837 A1* | 5/2016 | Szymanski ............. B27B 33/14 83/830 |
| 2016/0193749 A1* | 7/2016 | Seigneur ................ B27B 33/14 83/830 |
| 2016/0221209 A1 | 8/2016 | Harfst et al. |

\* cited by examiner

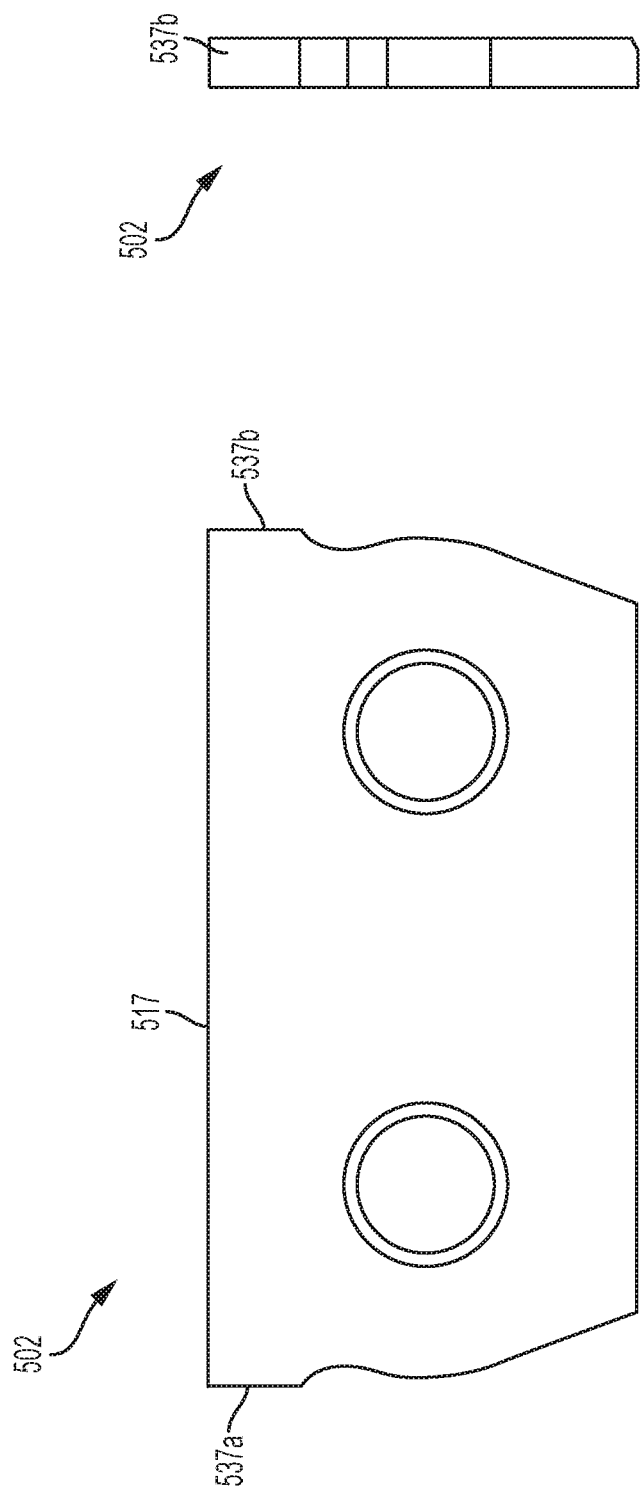

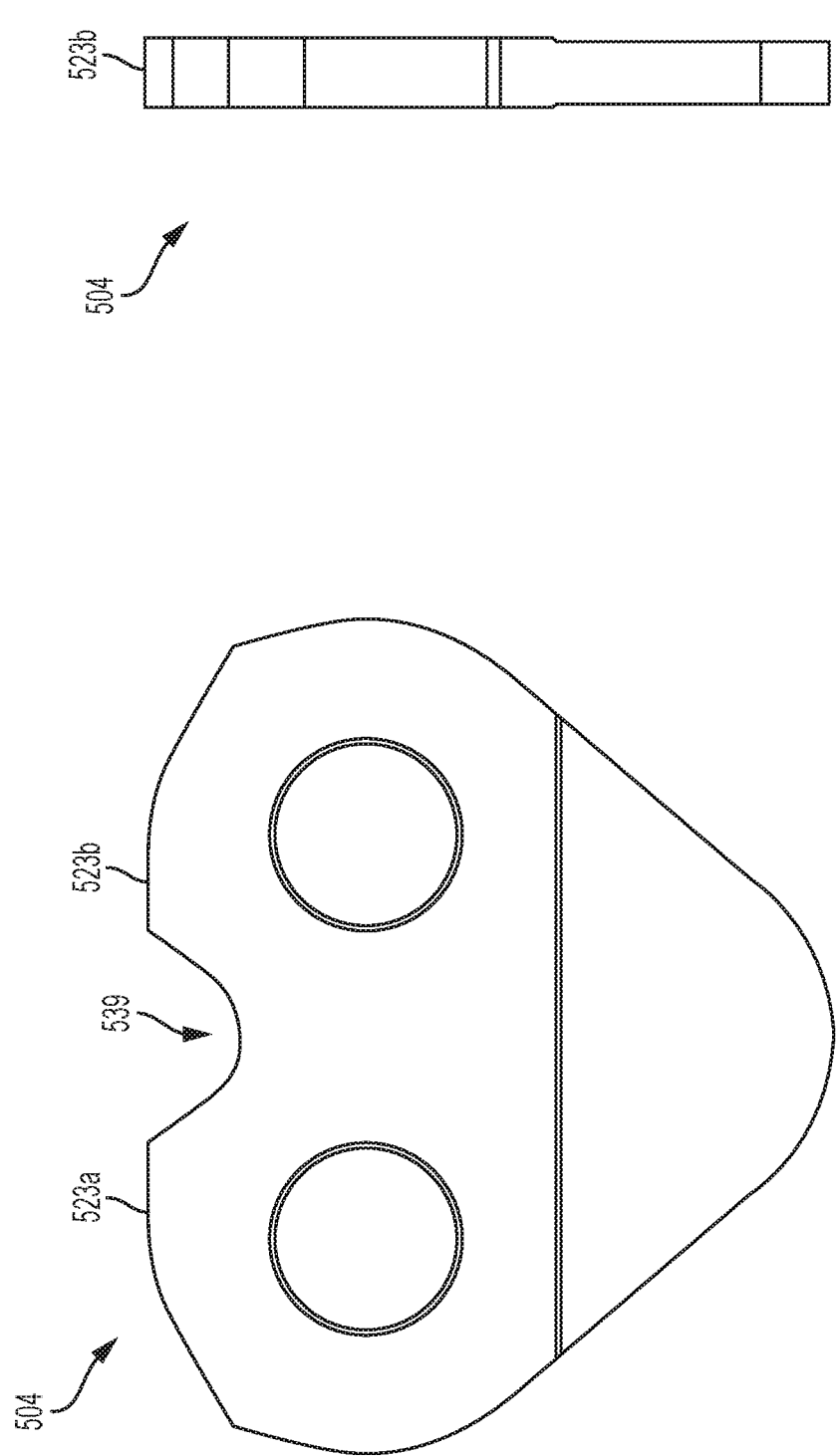

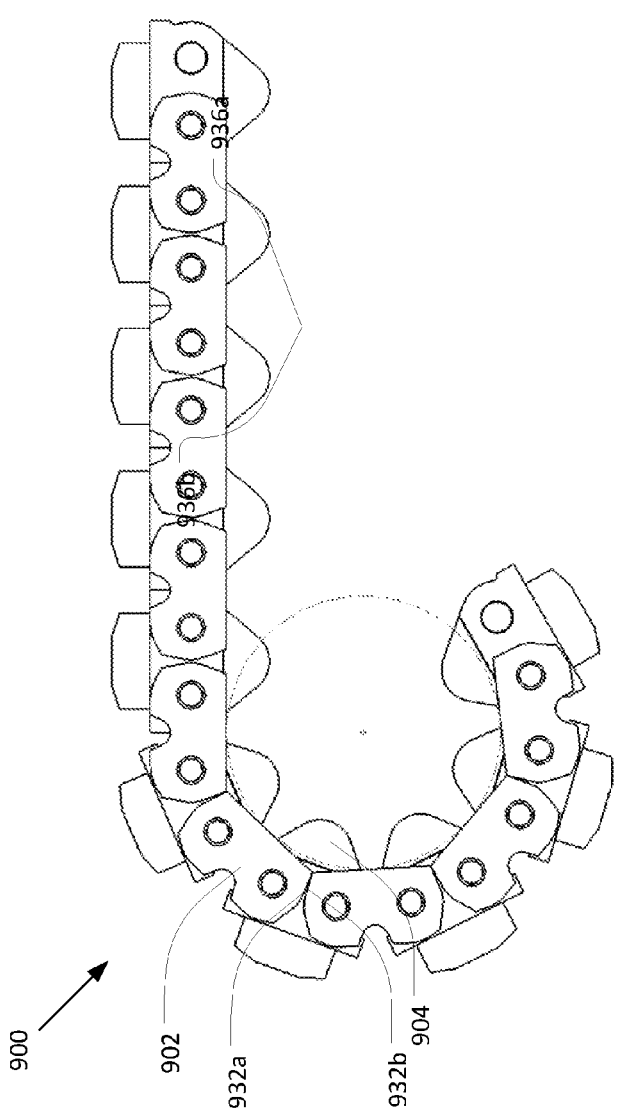
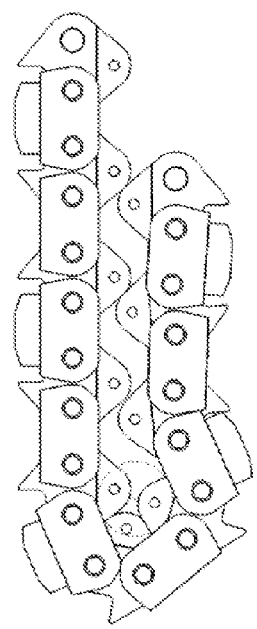
Figure 10A
Figure 10B

ABRASIVE SAW CHAIN

CROSS-REFERENCE TO RELATED APPLICATION

This application claims the priority benefit of the earlier filing date of U.S. Provisional Patent Application No. 62/264,783, filed Dec. 8, 2015, which is hereby incorporated herein by reference in its entirety.

TECHNICAL FIELD

Embodiments herein relate to the field of chainsaws, and, more specifically, to abrasive saw chain for chainsaws.

BACKGROUND

Chainsaws for cutting aggregate materials and/or pipe provide some advantages over alternative cutting devices, such as devices that include circular blades. For example, the chainsaw can perform deep cuts in confined spaces, create square corners without overcuts, and has the ability to cut small, precise openings. However, the chainsaw may require the operator to apply a higher feed load during cutting, may have generally slower cutting speed, and/or may have a shorter usable life for the cutting elements than a cutting device with a circular blade.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 6A illustrates a side view of a tie strap of the abrasive saw chain of FIG. 5, in accordance with various embodiments;

FIG. 6B illustrates a front view of the tie strap of FIG. 6A, in accordance with various embodiments;

FIG. 7A illustrates a side view of a drive link of the abrasive saw chain of FIG. 5, in accordance with various embodiments;

FIG. 7B illustrates a front view of the drive link of FIG. 7A, in accordance with various embodiments;

FIG. 10A illustrates a side view of the abrasive saw chain shown in FIG. 9A chain showing allowable forward chain articulation, in accordance with various embodiments;

FIG. 10B illustrates a side view of a conventional chain showing allowable forward chain articulation;

DETAILED DESCRIPTION OF DISCLOSED EMBODIMENTS

Figure 1A:
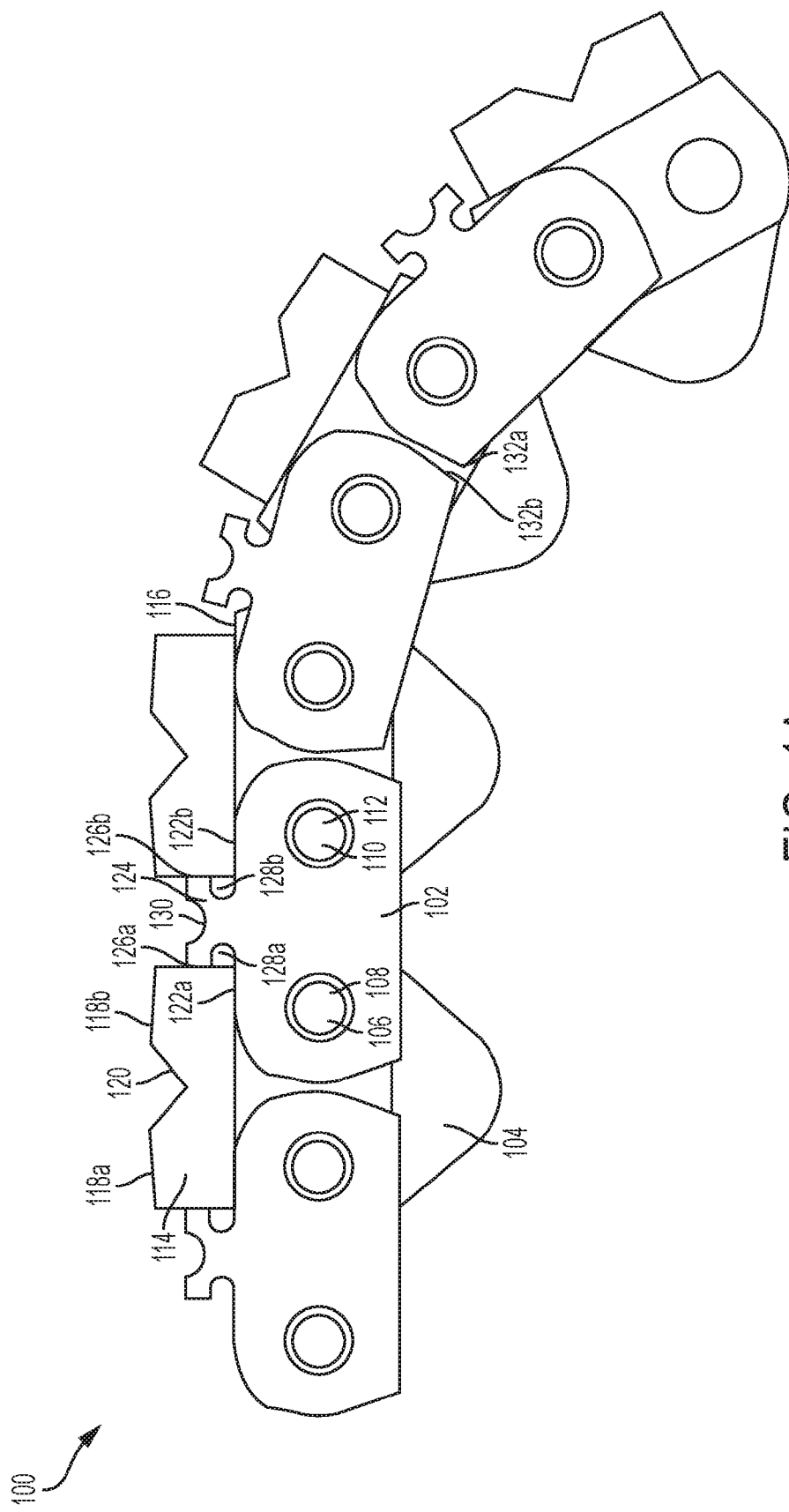
FIG. 1A illustrates a side view of an abrasive saw chain, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide apparatuses, systems, and methods associated with an abrasive saw chain for a chainsaw. The abrasive saw chain may be used to cut aggregate material, such as concrete, brick, etc.; pipe, and/or other hard materials. Abrasive saw chains typically require a wider kerf (cutting width) than cutting blades. The increased kerf width is directly proportional to increased power consumption and requires a higher feed load to be provided by the operator. The links of abrasive saw chains also have some degree of freedom for movement in the pitch, roll, and yaw axes. Such movement occurs not only within the chain, but also at the chain to guide bar interface. The motion generates vibration and impact loads that accelerate wear of the abrasive saw chain (e.g., cutting elements and/or chain chassis) and/or guide bar, and can increase the kerf width.

In various embodiments, a chainsaw may include a guide bar extending from a body of the chainsaw. The body may include a housing, with a motor disposed inside the housing to drive the saw chain around the guide bar. The guide bar may include a pair of rails, with a groove disposed between the rails. The guide bar may include one or more sprockets at ends of the guide bar, with elongate portions (e.g., straight portions or portions with a slight curvature) disposed between the ends of the guide bar. For example, with respect to the housing, the guide bar may include a drive sprocket at a proximal end of the guide bar and/or a nose sprocket at a distal end of the guide bar.

Various embodiments described herein provide an abrasive saw chain with one or more features to improve stability and/or performance of the abrasive saw chain. The improved stability may allow less side clearance of the cutting elements relative to the chain chassis and/or guide bar rails, thereby reducing the kerf width and the associated power consumption and feed load. The improved stability may additionally or alternatively provide reduced wear to extend the usable life of the abrasive saw chain (e.g., cutting elements and/or chain chassis) and/or guide bar. The extended usable life provided by improved stability may also allow use of softer cutting elements to improve cutting efficiency and reduce feed load requirements. In some embodiments, the abrasive saw chain may not be designed to cut wood. Saw chain designed for cutting wood typically uses the chain movement, such as porpoising (e.g. wherein the cutter rides up and down), to increase the cutting efficiency of the chain. In a high stability chain, such as those abrasive chains disclosed herein, this type of movement is minimized, making them inefficient for cutting wood.

In embodiments herein, a disclosed abrasive saw chain has a limited range of articulation, for example, with respect to conventional abrasive saw chain, such as reduced forward and/or reverse articulation. In embodiments, the reduced range of articulation includes reduced forward articulation. By forward articulation, it is meant the degree in which the chain can bend around the radius of a circle, such as a sprocket, the way it would when coupled to a saw or guide bar during conventional operation (see, for example, FIG. 10A). In embodiments, the minimum forward articulation has a radius from about 0.800 inches to about 1.000 inches, such as about 0.800 inches, 0.850 inches, 0.900 inches, 0.950 inches, or about 1.000 inches, such as about 0.850 inches to about 0.950 inches in radius. In embodiments, the reduced range of articulation includes reduced reverse articulation. By reverse articulation, it is meant the degree in which the chain can bend around the radius of a circle opposite the way it would when coupled to a saw or guide bar during conventional operation (see, for example, FIG. 11A). In embodiments, the minimum reverse articulation has a radius greater than about 20 inches, such as greater than about 20 inches, greater than about 21 inches, greater than about 22 inches, greater than about 23 inches, greater than about 24 inches, greater than about 25 inches, greater than about 26 inches, greater than about 27 inches, greater than about 28 inches, greater than about 29 inches, or greater than about 30 inches. In some, the minimum reverse articulation is less than about 50 inches. In embodiments, the reduced range of articulation includes both a reduced forward articulation and a reduced reverse articulation. A primary benefit of limiting the range of articulation is that tie strap footprint surface area is increased which reduces footprint and guide bar rail wear rates. Reduced wear rates help to maintain stability at chain/bar interface through life. The chain re-enters the guide bar groove from the drive sprocket in a more controlled fashion which results in less impact loading on the guide bar rails and generates less vibration in the cutting system. Reduced reverse articulation enables cutting loads acting on diamond segments to be distributed evenly across multiple chassis components. In addition, reduced reverse articulation provides greater stability and reduces vibration which extends the life of the diamond segments. Reduced reverse articulation increases guide bar life by spreading wear across more guide bar rail area, prevents unwanted motion of the chain in the cut so the diamond segments maintain consistent and stable contact with the workpiece. On straight portions of guide bar rails, the chain acts more rigidly which promotes cutting efficiency and smoothness. In some embodiments, total articulation, both forward and reverse is reduced by about 55% to about 75% relative to conventional chain that does not include the stability features disclosed herein, for example the total articulation, both forward and reverse is reduced by about 60% to about 70% about 62% to about 68%, or even about 65% and the like. There are significant benefits of limiting the range of articulation. With respect to reduced forward articulation, tie strap footprint surface area is increased which reduces footprint and guide bar rail wear rates. Reduced wear rates help to maintain stability at chain/bar interface through life. In addition, the chain re-enters the guide bar groove from the drive sprocket in a more controlled fashion resulting in less impact loading on the guide bar rails. This also generates less vibration in the cutting system which may allow for more precise cuts and the use of narrower kerf. With respect to reduced reverse articulation, a reduction in reverse articulation enables cutting loads acting on diamond segments to be distributed evenly across multiple chassis components. A reduction of reverse articulation also provides greater stability and reduces vibration which extends the life of the diamond segments. Reduced reverse articulation increases guide bar life by spreading wear across more guide bar rail area, and prevents unwanted motion of the chain in the cut so the diamond segments maintain consistent and stable contact with the workpiece. On straight portions of guide bar rails, the chain acts more rigidly which promotes cutting efficiency and smoothness.

In various embodiments, the abrasive saw chain may include a plurality of links coupled to one another, including one or more drive links and/or tie straps. The links may include a pair of rivet holes (e.g., a front rivet hole and a rear rivet hole) to couple the links to respective adjacent links. The drive links may be center links that ride in the groove of the guide bar and/or engage with an internal tooth of the sprockets. The tie straps may be side links (e.g., left-side links or right-side links) that engage with one of the rails of the guide bar. The tie straps may couple successive drive links to one another (e.g., using rivets disposed through the rivet holes of the tie straps and/or drive links, or via another arrangement/coupling).

In various embodiments, a cutting element may be coupled to an upper surface of some or all of the drive links of the abrasive saw chain. In other embodiments, a cutting element may be coupled to an upper surface of some or all of the tie straps of the abrasive saw chain, for example spanning two opposite tie straps. The cutting element may be any cutting element suitable for cutting the desired material, such as aggregate material and/or pipe. For example, in some embodiments, the cutting element may include diamond segments and/or another suitable hard and/or abrasive material. The cutting elements may extend across an entire width of the abrasive saw chain. For example, the cutting elements may extend laterally to the same extent as the tie straps in both lateral directions, for example so that the chain and/or guide bar can slide into a slot the width of the cutting elements.

As discussed above, the disclosed abrasive saw chain may include one or more features to improve stability and/or performance of the abrasive saw chain. For example, an upper surface of the tie strap may contact a lower surface of the cutting element to provide support for the cutting element. In some embodiments, the upper surface of the tie strap may contact the lower surface of the cutting element when the tie strap and corresponding drive link traverse the elongate portion of the guide bar and when the tie strap and the drive link traverse the sprocket of the guide bar. Alternatively, the upper surface of the tie strap may contact the lower surface of the cutting element when the tie strap and corresponding drive link traverse the elongate portion of the guide bar, but there may be a gap between the upper surface of the tie strap and the lower surface of the cutting element when the tie strap and the drive link traverse the sprocket of the guide bar. In embodiments, the upper surface of the tie strap contacts and may support the lower surface of the cutting element when the tie strap and the drive link are under load substantially perpendicular to a long axis of the tie strap for example wherein there is a gap between the upper surface of the tie strap and the lower surface of the cutting element when the tie strap and the drive link are not under load substantially perpendicular to a long axis of the tie strap. In such embodiments, the load applied is effectively shared across multiple links of the chain.

In some embodiments, the tie strap may include a limiting feature to contact end (front/back) surfaces of adjacent cutting elements when the links traverse an elongate portion of a guide bar. Alternatively, or additionally, the drive links may include a mating surface that contacts a mating surface of an adjacent drive link when the drive links traverse the elongate portion of the guide bar. The limiting feature of the tie straps and/or the mating surfaces of the drive links may prevent rotation (e.g., reverse articulation) of the cutting elements when the drive links exit a sprocket and while traversing the elongate portion of the guide bar. In embodiments, the mating surfaces are substantially perpendicular to a long axis of the guide bar. In embodiments, the mating surfaces of a drive link extend over the mating surfaces of an adjacent drive link, for example at an angle of between about 10° and 80°, such as between about 30° and about 60° or about 45°. The extensions of the mating surfaces serves to both constrain reverse articulation and control vertical misalignment of the cutting drive links, for example to enhance the chain stability. In some embodiments, the extensions of the mating surfaces provide a desired translational constraint along with sufficient cross-sectional area between contact surfaces to minimize material deformation and burrs due to impact loading. Furthermore, one of the benefits of including such mating surfaces is that in applications where water is used, such as the cutting of aggregate, the water is retained in the guide bar, which may reduce the total water consumption needed for cutting.

In some embodiments, the abrasive saw chain and/or tie straps may be designed such that the lower corners (e.g., defined by the bottom surface and side surface) of adjacent tie straps are within 0.02 inches or less of one another when the tie straps traverse the sprocket of the guide bar. When traversing an elongate portion of the guide bar, those same surfaces may be 0.15 inches or more from each other. The closeness of the corners may provide a contact area limiting further forward articulation in the event the tie straps over-rotate when traveling around the sprocket, and may increase contact area with the rails of the elongate portion of the guide bar to improve stability and reduce wear.

In some embodiments, an aspect ratio of the drive links and/or tie straps of the abrasive saw chain (and/or the abrasive saw chain as a whole) may be lower than in conventional saw chains. The aspect ratio may be defined as the ratio of the height of the drive links and/or tie straps compared with the distance between the rivet holes of the respective drive links and/or tie straps. In some embodiments, the height may be measured as the height of the distance that the drive link extends above the rails of the guide bar. In some embodiments, the aspect ratio of the drive links may be 1.0 to 1.15. Additionally, or alternatively, the aspect ratio of the tie straps may be 0.9 to 1.02. For reference, typically conventional chain tie strap aspect ratio is 1.05. These aspect ratio values do not include the height of the cutting element. The reduced aspect ratio of the drive links, tie straps, and/or abrasive saw chain may allow the cutting load to act closer to the guide bar rails, thereby reducing unwanted movement/vibration (e.g., roll, pitch, and/or yaw) of the links for the benefit of increased stability.

In some embodiments, the aspect ratio of the links and/or abrasive saw chain may be reduced from prior designs without changing the cross-sectional area of material around the rivet holes and/or the hub and flange dimensions of the rivets.

In various embodiments, the increased stability of the abrasive saw chain provided by the abrasive saw chain described herein may allow the side clearance of the abrasive saw chain to be reduced, which may provide a reduced width for the cutting elements. The side clearance may be the amount that the cutting elements extend laterally past the tie straps and/or the guide bar rails. The reduced width of the cutting elements provides a narrower kerf for cutting which reduces the power consumption of the tool and requires less feed load from the operator. In embodiments, a suitable kerf width is 0.185 inches to 0.205 inches.

Figure 1B:
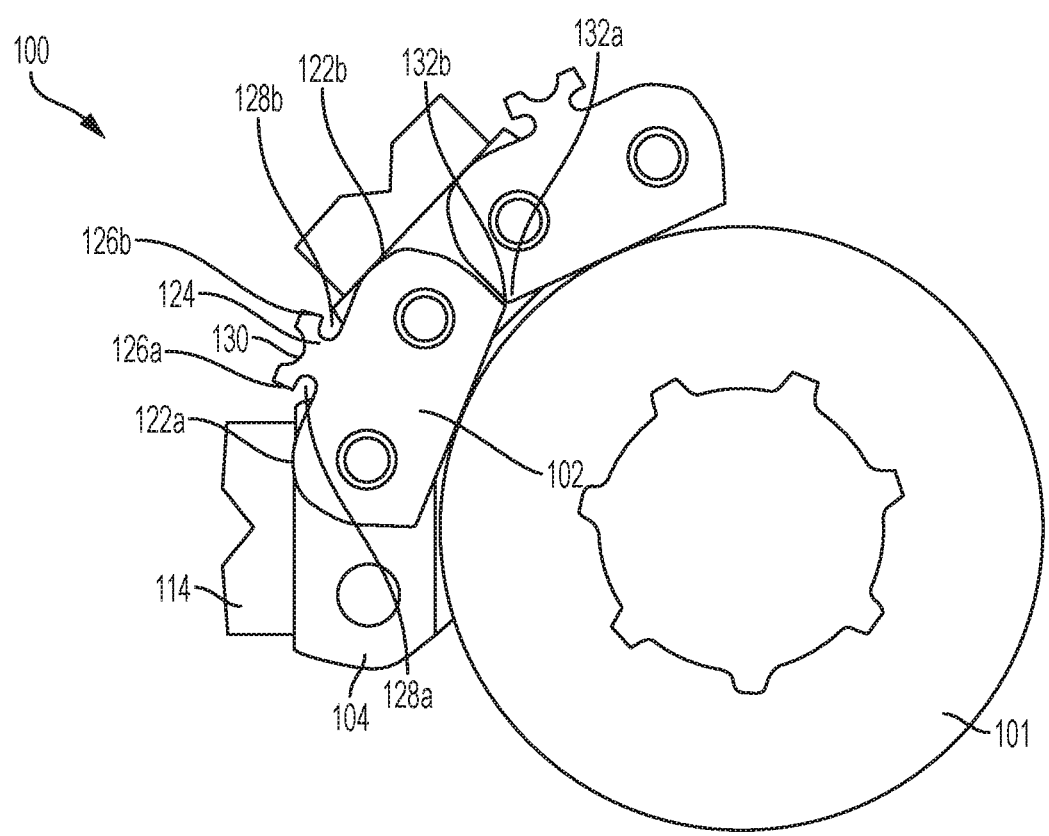
FIG. 1B illustrates a side view of a portion of the abrasive saw chain of FIG. 1A as it traverses a sprocket, in accordance with various embodiments.

FIG. 1A illustrates an abrasive saw chain 100 in accordance with various embodiments. Additionally, FIG. 1B illustrates a portion of the abrasive saw chain 100 as it traverses a sprocket 101 of a guide bar. The abrasive saw chain 100 includes tie straps 102 and drive links 104 coupled to one another via respective rivet holes. For example, the tie straps 102 may include a rear rivet hole 106 that engages with a front rivet hole 108 of a drive link 104 (e.g., via a rivet (not shown) disposed through the rivet holes 106 and 108). The tie straps 102 may further include a forward rivet hole 110 that engages with a rear rivet hole 112 of another drive link 104 in the abrasive saw chain 100.

In some embodiments, the sprocket 101 shown in FIG. 1B may be the drive sprocket of the chainsaw. The drive sprocket may have a smaller pitch diameter compared to the nose sprocket. Accordingly, the maximum forward articulation of the abrasive saw chain 100 may be designed with respect to the pitch diameter of the drive sprocket.

Although not visible in FIG. 1A, the abrasive saw chain 100 may include tie straps disposed on the other side of the drive links 104 from the tie straps 102. The other tie straps may be opposite the tie straps 102 and may be coupled with the drive links 104 and tie straps 102 via respective rivet holes.

In various embodiments, the abrasive saw chain 100 may further include cutting elements 114 coupled to an upper surface 116 of the drive links 104. The cutting elements 114 may include diamond and/or another suitable hard and/or abrasive material. In some embodiments, the cutting elements 114 may have a top surface with two portions 118a-b that are substantially planar (either aligned in the direction of travel or disposed at an angle) and separated by a notch 120. Notch 120 is optional both in presence and appearance, but it represents an approach to reducing the surface area of the cutting element contact surface. In some embodiments, the cutting elements 114 may be bonded to the upper surface 116 of the drive links 104, such as by welding.

In some embodiments, as shown in FIG. 1A, each drive link 104 may have a cutting element 114 coupled thereto. Such a configuration is known as a "full-house" configuration. In other embodiments, some of the drive links 104 of the abrasive saw chain 100 may have a cutting element 114 coupled thereto and some other drive links 104 may not have a cutting element 114 coupled thereto, see, for example the embodiments shown in FIGS. 8A and 8B.

In various embodiments, a portion 122a-b of an upper surface of the tie straps 102 may be substantially coplanar and/or aligned with the upper surface 116 of the drive link 104 to which the tie strap 102 is coupled. Accordingly, the bottom surface of the cutting elements 114 may be in direct contact with the upper surface of the tie straps 102. In embodiments there may be a nominal gap, such as a 0.002 inch gap, between the upper surface of the tie straps 102 and the bottom surface of the cutting elements 114. However, the bottom surface of the cutting elements 114 may not be bonded to the upper surface of the tie straps 102 (e.g., by the welding process). Accordingly, the portions 122a-b of the upper surface may provide support to the cutting elements 114.

In some embodiments, as shown in FIGS. 1A and 1B, the cutting elements 114 may contact (e.g., be supported by) the upper surface of the tie straps 102 while the corresponding drive link 104 traverses the elongate portion of the guide bar and while the drive link 104 traverses the sprocket 101 of the guide bar. Such an arrangement may be accomplished by forming a curved transition surface from the upper surface of tie straps 102 to the front and/or back surfaces of tie straps 102.

In various embodiments, the tie straps 102 may further include a limiting feature 124 that extends above the body of the tie strap 102. The limiting feature 124 may include mating surfaces 126a-b that contact respective end (front/back) surfaces of adjacent cutting elements 114. In some embodiments, the mating surfaces 126a-b may contact the front/back surfaces of adjacent cutting elements 114 when the tie strap 102 and corresponding drive links 104 are traversing the elongate portion of the guide bar, and the mating surfaces 126a-b may not contact the side surfaces of adjacent cutting elements 114 when the tie strap 102 and corresponding drive links 104 are traversing the sprocket 101. The limiting features 124 may prevent and/or reduce reverse articulation and/or other unwanted movement of the drive links 104 while the drive links 104 traverse the elongate portion of the guide bar.

In various embodiments, the limiting features 124 may include gaps 128a-b between the mating surfaces 126a-b and the upper surface of the tie strap 102 (e.g., the portions 122a-b). The gaps 128a-b may avoid having a tight fit or misfit of the bottom corners of the cutting elements 114 against the tie strap 102, which may otherwise cause stress on the links and/or require tight manufacturing tolerances.

In some embodiments, the limiting features 124 may additionally or alternatively include a gap 130 in the top surface of the limiting feature 124 between the mating surfaces 126a-b. The gap 130 may allow for the tie strap to use less material than if the limiting feature 124 did not have a gap. In some cases, during use, the cutting elements 114 may be worn down to, or below, the height of the limiting features 124. The gap 130 may reduce the area of the top surface of the limiting feature 124 that comes into contact with the workpiece when the cutting elements 114 are worn.

In various embodiments, the abrasive saw chain 100 and/or tie straps 102 may be configured to provide an increased contact area between the bottom surface of the tie straps 102 and the guide bar rail compared with conventional saw chains. For example, the corners 132a-b defined by the bottom surface and respective side surfaces of the tie straps 102 may be positioned so that the adjacent corners 132a-b of adjacent tie straps 102 may be within less than 0.02 inches from one another as the tie straps 102 traverse the sprocket 101 of the guide bar. The spacing between adjacent corners may provide increased stability and decreased wear while maintaining the bend radius needed to traverse the sprocket 101.

Figure 2:
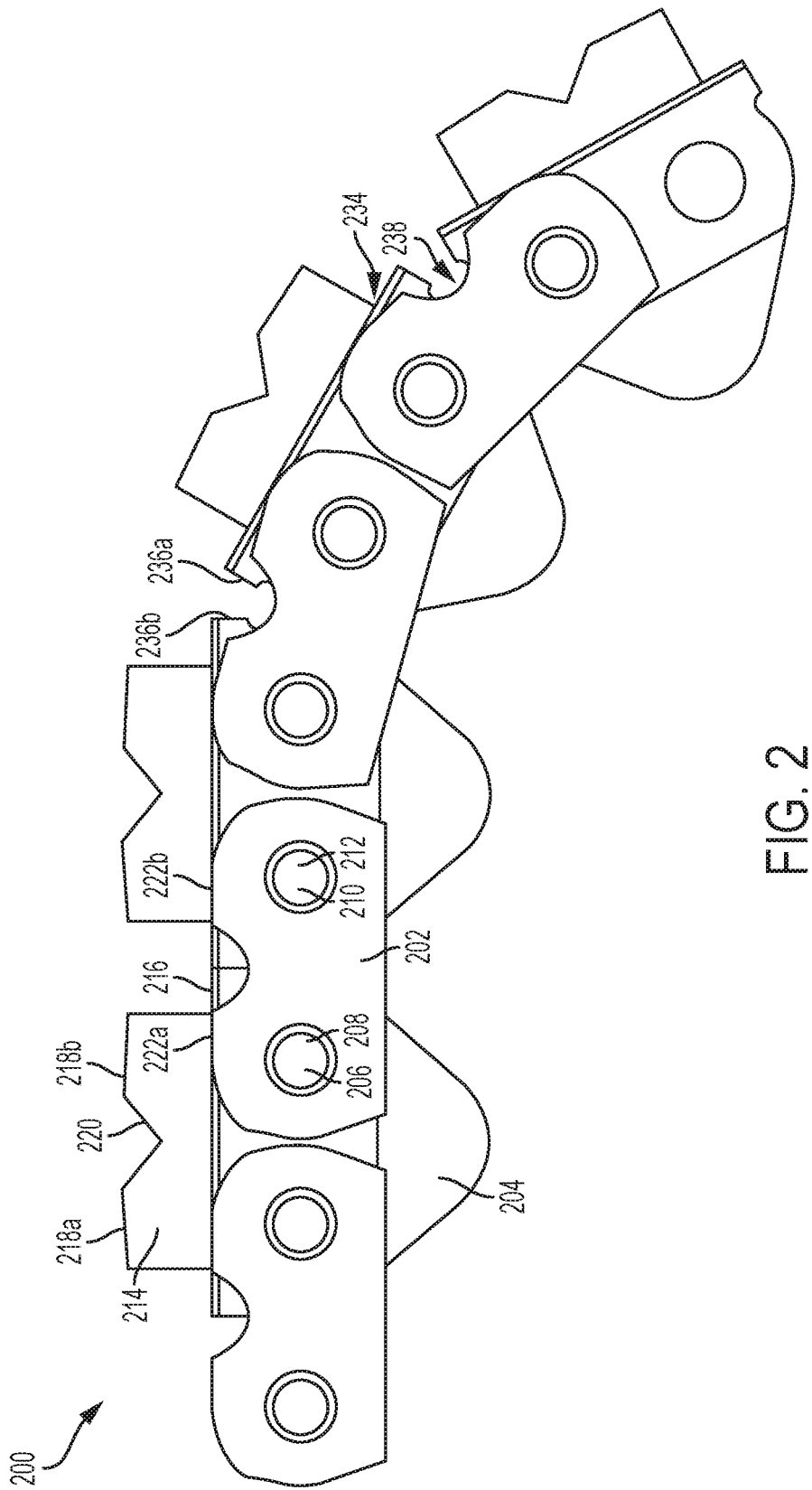
FIG. 2 illustrates a side view of another abrasive saw chain, in accordance with various embodiments.

FIG. 2 illustrates an abrasive saw chain 200 in accordance with various embodiments. The abrasive saw chain 200 includes tie straps 202 and drive links 204 coupled to one another via respective rivet holes. For example, the tie straps 202 may include a rear rivet hole 206 that engages with a front rivet hole 208 of a drive link 204 (e.g., via a rivet (not shown) disposed through the rivet holes 206 and 208). The tie straps 202 may further include a forward rivet hole 210 that engages with a rear rivet hole 212 of another drive link 204 in the abrasive saw chain 200.

Figure 3B:
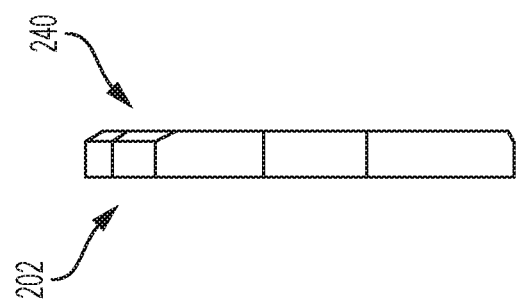
FIG. 3B illustrates a front view of the tie strap of FIG. 3A, in accordance with various embodiments.
Figure 3A:
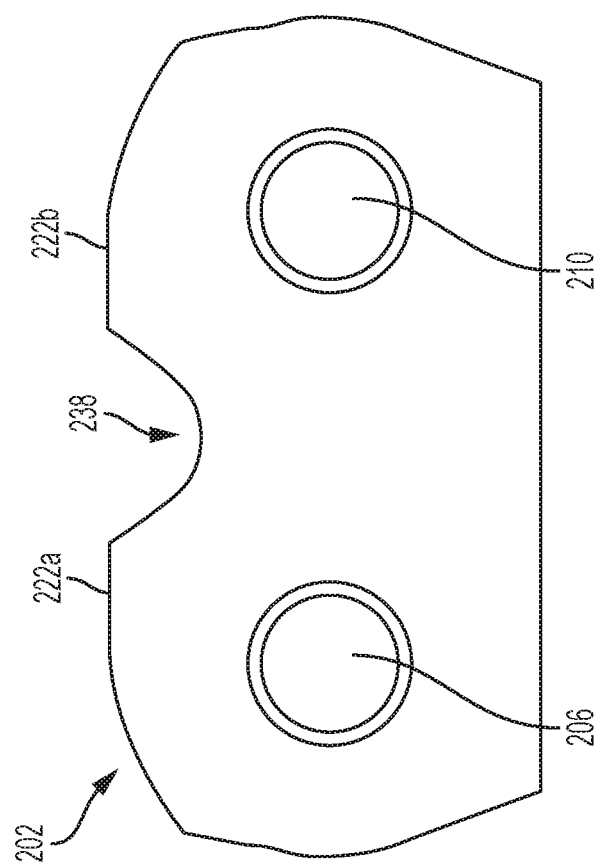
FIG. 3A illustrates a side view of a tie strap of the abrasive saw chain of FIG. 2, in accordance with various embodiments.
Figure 4B:
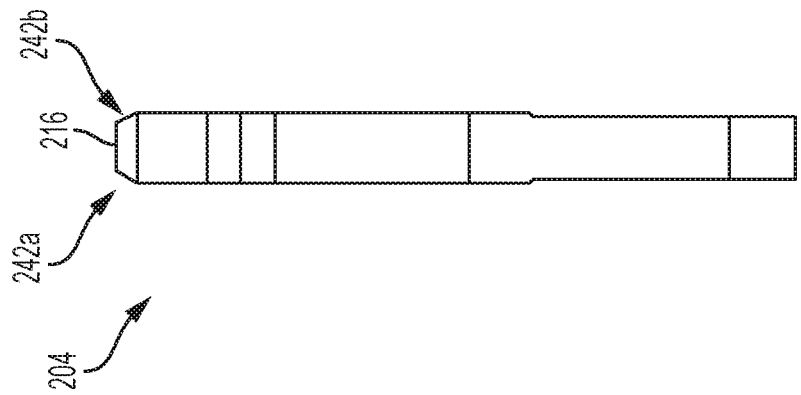
FIG. 4B illustrates a front view of the drive link of FIG. 4A, in accordance with various embodiments.
Figure 4A:
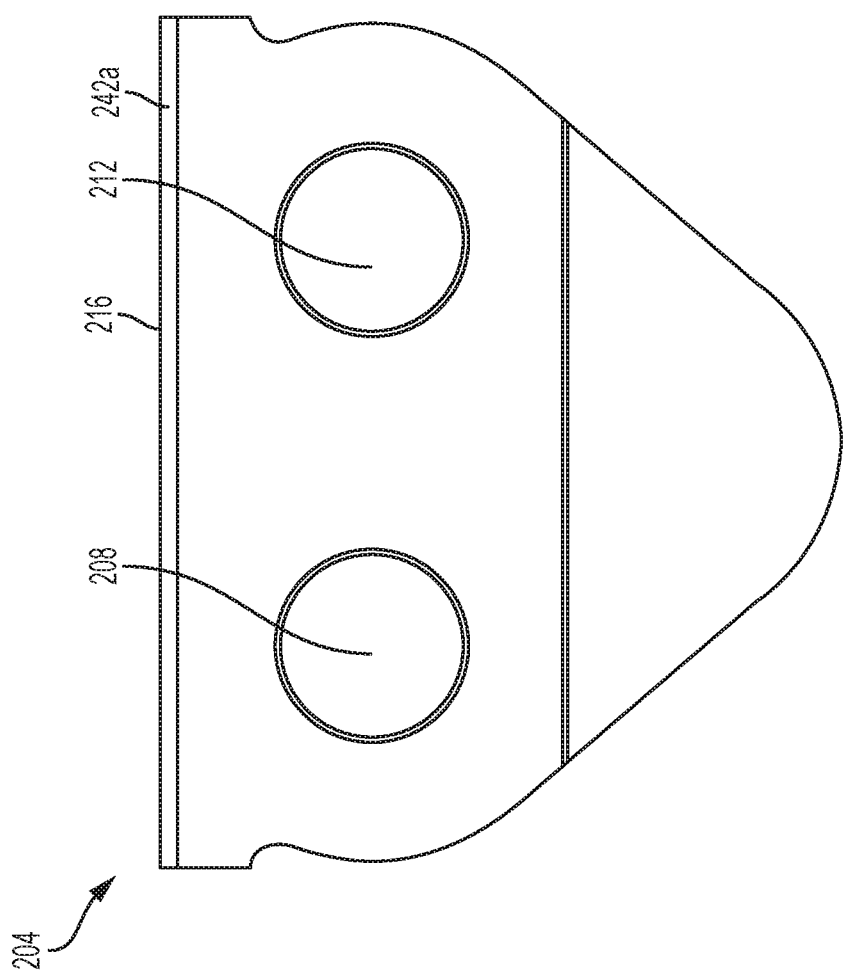
FIG. 4A illustrates a side view of a drive link of the abrasive saw chain of FIG. 2, in accordance with various embodiments.

A side view of the tie strap 202 is shown in FIG. 3A, and a front view of the tie strap 202 is shown in FIG. 3B. A side view of the drive link 204 is shown in FIG. 4A, and a front view of the drive link 204 is shown in FIG. 4B. Although not visible in FIG. 2, the abrasive saw chain 200 may include tie straps disposed on the other side of the drive links 204 from the tie straps 202. The other tie straps may be opposite the tie straps 202 and may be coupled with the drive links 204 and tie straps 202 via respective rivets.

In various embodiments, the abrasive saw chain 200 may further include cutting elements 214 coupled to an upper surface 216 of the drive links 204. The cutting elements 214 may include diamond and/or another suitable hard and/or abrasive material. In some embodiments, the cutting elements 214 may have a top surface with two portions 218a-b that are substantially planar (either aligned in the direction of travel or disposed at an angle) and separated by a notch 220. In some embodiments, the cutting elements 214 may be bonded to the upper surface 216 of the drive links 204, such as by welding.

In various embodiments, a portion 222a-b of an upper surface of the tie straps 202 may be substantially coplanar and/or aligned with the upper surface 216 of the drive link 204 to which the tie strap 202 is coupled. Accordingly, the bottom surface of the cutting elements 214 may be in direct contact with the upper surface of the tie straps 202. In embodiments there may be a nominal gap, such as a 0.002 inch gap, between the upper surface of the tie straps 202 and the bottom surface of the cutting elements 214. However, the bottom surface of the cutting elements 214 may not be bonded to the upper surface of the tie straps 202 (e.g., by the welding process). Accordingly, the portions 222a-b of the upper surface may provide support to the cutting elements 214.

In some embodiments, as shown in FIG. 2, the cutting elements 214 may contact (e.g., be supported by) the portions 222a-b of the upper surface of the tie straps 202 while the corresponding drive link 204 traverses the elongate portion of the guide bar. However, there may be a gap 234 between the bottom surface of the cutting elements 214 and the upper surface of the tie straps 202 while the drive link 204 traverses the sprocket of the guide bar (as illustrated by the right-most tie strap 202 and drive link 204 shown in FIG. 2). The gap 234 may assist manufacturability, avoid tight joints caused by over-constrained links, and/or permit rotation of the tie straps 202 relative to the drive links 204 when traversing the sprocket (in another example see FIG. 9A). In some embodiments, the gap 234 may be 0.001 to 0.02 inches.

In various embodiments, the drive links 204 may include mating surfaces 236a-b that contact the respective mating surface 236a-b of the adjacent drive link 204 when the drive links 204 traverse the elongate portion of the guide bar. The mating surfaces 236a-b may be separated from (e.g., not in contact with) the respective mating surface 236a-b when the drive links 204 are traversing the sprocket. The mating surfaces may prevent and/or reduce reverse articulation and/or other unwanted movement of the drive links 204 when the drive links 204 exit the sprocket and while traversing the elongate portion of the guide bar.

The mating surfaces 236a-b may be included as an alternative to or in addition to the limiting features 124 of the abrasive saw chain 100 discussed above. However, in some cases, the mating surfaces 236a-b may form a raised burr from impact loading during articulation. Accordingly, in some embodiments, as shown in FIG. 2, the tie straps 202 may include a relief gullet 238 that is aligned with the mating surfaces 236a-b to accommodate the raised burr.

As seen in FIG. 3B, in some embodiments, the tie strap 202 may include a chamfer 240 on the upper portion of the inside side edge. The chamfer 240 may provide a relief angle to facilitate laser welding of the cutting element 214 to the drive link 204. For example, the chamfer 240 on the tie strap 202 may provide a relief angle to allow for clearance should the laser weld between the cutting element 214 and the drive link 204 protrude slightly beyond the first side or the second side of the drive link. The tie strap 202 may include a chamfer 240 on one or both inside side edges.

As seen in FIG. 4B, in some embodiments the drive link 204 may include chamfers 242a-b on one or both top edges of the drive link 204. The chamfers 242a-b may provide a relief angle to facilitate laser welding of the drive link 204. For example, the chamfers 242a-b may provide a relief angle to prevent or reduce the amount that the laser weld may protrude beyond the first side and/or second side of the drive link. In some embodiments, the chamfers 242a-b may extend the length of the top edges of the drive link 204.

Figure 5:
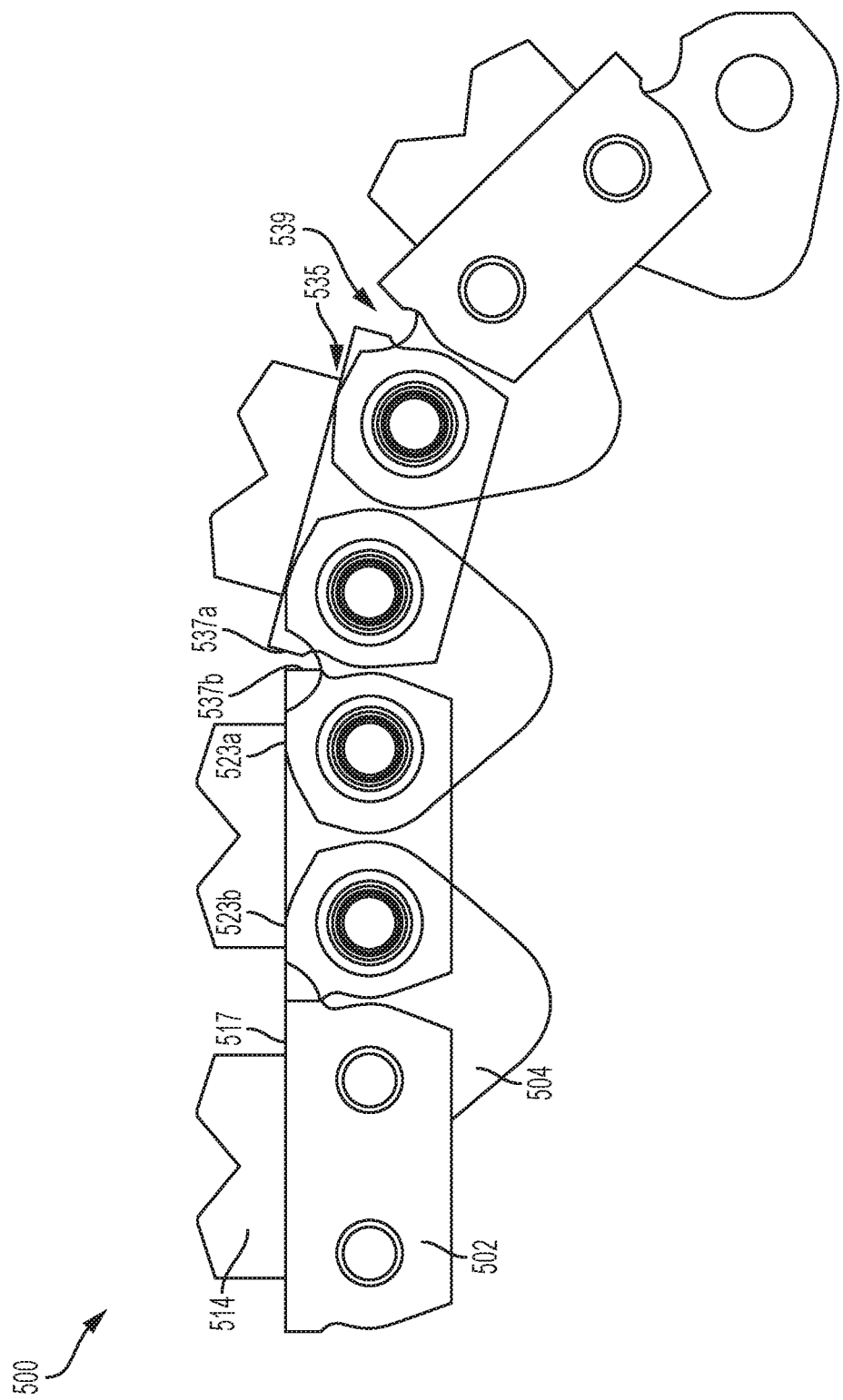
FIG. 5 illustrates a side view of another abrasive saw chain, in accordance with various embodiments.

FIG. 5 illustrates an abrasive saw chain 500 in which the cutting element 514 is bonded to upper surfaces of an opposing pair of tie straps 502, in accordance with various embodiments. The abrasive saw chain 500 includes tie straps 502 and drive links 504 coupled to one another via respective rivet holes. A side view of the tie strap 502 is shown in FIG. 6A, and a front view of the tie strap 502 is shown in FIG. 6B. A side view of the drive link 504 is shown in FIG. 7A, and a front view of the drive link 504 is shown in FIG. 7B.

Although not visible in FIG. 5, the abrasive saw chain 500 may include tie straps disposed on the other side of the drive links 504 from the tie straps 502. The other tie straps may be opposite the tie straps 502 and may be coupled with the drive links 504 and tie straps 502 via respective rivets. The middle two tie straps 502 are shown in FIG. 5 to be transparent to show the structure of the drive links 504.

In various embodiments, the abrasive saw chain 500 may further include cutting elements 514 bonded (e.g., by welding, such as laser welding) to an upper surface 517 of the tie strap 502. The cutting elements 514 may be further bonded to an upper surface of the respective opposing tie strap (not shown). The cutting elements 514 may include diamond and/or another suitable hard and/or abrasive material. In some embodiments, the upper surface 517 of the tie strap 502 may be substantially flat to facilitate bonding with the cutting element 514.

In various embodiments, a portion 523a-b of an upper surface of the drive links 504 may be substantially coplanar and/or aligned with the upper surface 517 of the tie strap 502 to which the drive link 504 is coupled. Accordingly, the bottom surface of the cutting elements 514 may be in direct contact with the upper surface of the drive links 504. However, the bottom surface of the cutting elements 514 may not be bonded to the upper surface of the drive links 504 (e.g., by the welding process). Accordingly, the portions 523a-b of the upper surface may provide support to the cutting elements 514.

In some embodiments, as shown in FIG. 5, the cutting elements 514 may contact (e.g., be supported by) the portions 523a-b of the upper surface of the drive links 504 while the corresponding tie strap 502 traverses the elongate portion of the guide bar. However, there may be a gap 535 between the bottom surface of the cutting element 514 and the upper surface of the drive link 504 while the drive link 504 traverses the sprocket of the guide bar. The gap 535 may assist manufacturability, avoid tight joints caused by over-constrained links, and/or permit rotation of the tie straps 502 relative to the drive links 504 when traversing the sprocket. In some embodiments, the gap 535 may be 0.001 to 0.02 inches.

In various embodiments, the tie straps 502 may include mating surfaces 537a-b that contact the respective mating surface 537a-b of the adjacent (e.g., forward or rearward) tie strap 502 when the tie straps 502 traverse the elongate portion of the guide bar. The mating surfaces 537a-b may be separated from (e.g., not in contact with) the respective mating surface 537a-b when the tie straps 502 are traversing the sprocket. The mating surfaces 537a-b may prevent and/or reduce reverse articulation and/or other unwanted movement of the tie straps 502 when the tie straps 502 exit the sprocket and while traversing the elongate portion of the guide bar.

In some cases, the mating surfaces 537*a*-*b* may form a raised burr from impact loading during articulation. Accordingly, in some embodiments, as shown in FIG. 5, the drive links may include a relief gullet 539 that is aligned with the mating surfaces 537*a*-*b* to accommodate the raised burr.

Figure 8A:
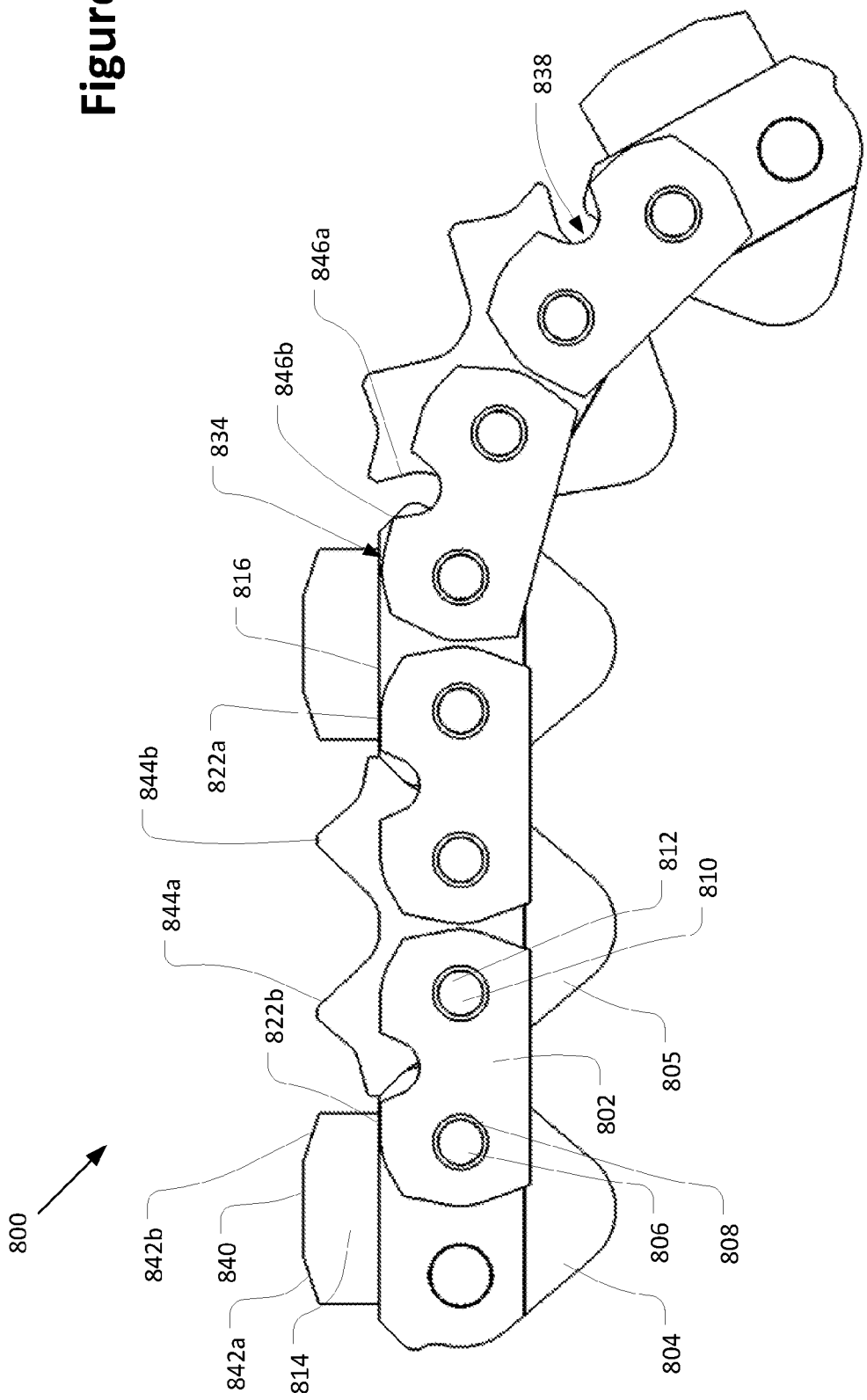
FIG. 8A illustrates a side view of another abrasive saw chain, in accordance with various embodiments.
Figure 8B:
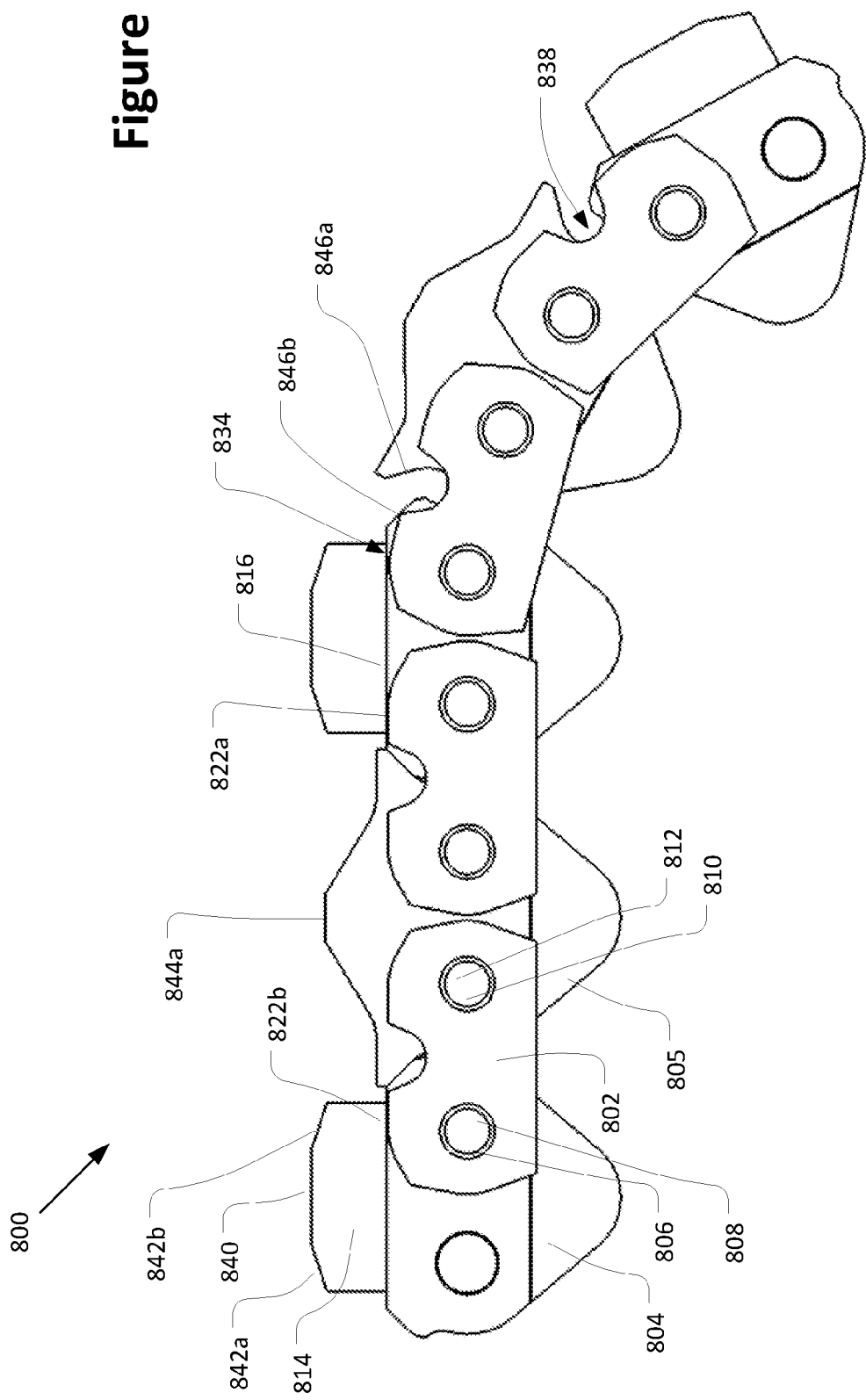
FIG. 8B illustrates a side view of another abrasive saw chain, in accordance with various embodiments.

FIGS. 8A and 8B illustrate side views of various abrasive saw chain, in accordance with various embodiments. The abrasive saw chain 800 includes tie straps 802, cutting drive links 804, and non-cutting drive links 805 coupled to one another via respective rivet holes in an every other alternating pattern. The tie straps 802 may include a rear rivet hole 806 that engages with a front rivet hole 808 of a drive link 804 or 805 (e.g., via a rivet (not shown) disposed through the rivet holes 806 and 808). The tie straps 802 may further include a forward rivet hole 810 that engages with a rear rivet hole 812 of another drive link 804 or 805 in the abrasive saw chain 800. Although not visible in FIGS. 8A and 8B, the abrasive saw chain 800 may include tie straps disposed on the other side of the drive links 804, 805 from the tie straps 802. The other tie straps may be opposite the tie straps 802 and may be coupled with the drive links 804, 805 and tie straps 802 via respective rivets.

In various embodiments, the abrasive saw chain 800 may further include cutting elements 814 coupled to an upper surface 816 the cutting drive links 804. In some embodiments, the cutting elements 814 may have a top surface with a central portion 840 that is substantially planar and aligned in the direction of travel, and two end portions 842*a*-*b* that are disposed at an angle relative to the central portion 840.

The cutting elements 814 may include diamond and/or another suitable hard and/or abrasive material. In some embodiments, the cutting elements 814 may be bonded to the upper surface 816 of the cutting drive links 804, such as by welding. In various embodiments, a portion 822*a*-*b* of an upper surface of the tie straps 802 may be substantially coplanar and/or aligned with the upper surface 816 of the cutting drive links 804 to which the tie strap 802 is coupled. Accordingly, the bottom surface of the cutting elements 814 may be in direct contact with the upper surface of the tie straps 802. However, the bottom surface of the cutting elements 814 may not be bonded to the upper surface of the tie straps 802 (e.g., by the welding process). Accordingly, the portions 822*a*-*b* of the upper surface may provide support to the cutting elements 814. In some embodiments, as shown in FIGS. 8A and 8B, the cutting elements 814 may contact (e.g., be supported by) the portions 822*a*-*b* of the upper surface of the tie straps 802 while the corresponding cutting drive link 804 traverses the elongate portion of the guide bar. However, there may be a gap 834 between the bottom surface of the cutting elements 814 and the upper surface of the tie straps 802 while the cutting drive link 804 traverses the sprocket of the guide bar (as illustrated by the second to the right-most tie strap 802 and cutting drive link 804 shown in FIGS. 8A and 8B). The gap 834 may assist manufacturability, avoid tight joints caused by over-constrained links, and/or permit rotation of the tie straps 802 relative to cutting drive link 804 when traversing the sprocket. In some embodiments, the gap 834 may be 0.001 to 0.02 inches. In embodiments, there may be a nominal gap, such as a 0.002 inch gap, between the upper surface of the tie straps 802 and the bottom surface of the cutting elements 814. Such a gap may still support the cutting element, for example via compliance in the chain such that the tie straps 802 and cutter drive links have relative up/down movement with respect to each other.

In the embodiments shown, the non-cutting drive links 805 in which the cutting elements 814 are coupled can include one or more bumpers 844*a*-*b* on the upper surface of non-cutting drive links 805. The inclusion of non-cutting drive links 805 with one or more bumpers 844*a*-*b* provides for gaps in the cutting surfaces, while maintain stability in the cut. The single and double bumper versions shown are primarily by example. In embodiments, the various potential bumper profiles create a relatively smooth transition between cutting elements yet minimize the amount of steel introduced into the cut, which simply causes drag and friction.

In various embodiments, the cutting drive links 804 and the non-cutting drive links 805 may include mating surfaces 846*a* and 846*b*, respectively that contact the respective mating surface 846*a*-*b* of the adjacent drive links 804, 805 when the drive links 804, 805 traverse the elongate portion of the guide bar. The mating surfaces 846*a*-*b* may be separated from (e.g., not in contact with) the respective mating surface 846*a*-*b* when the drive links 804 are traversing the sprocket. The mating surfaces may prevent and/or reduce reverse articulation and/or other unwanted movement of the drive links 804, 805 when the drive links 804, 805 exit the sprocket and while traversing the elongate portion of the guide bar. The mating surfaces 846*a*-*b* may prevent and/or reduce downward translation of cutting drive link 804 and upward translation of an adjacent non-cutting drive link 805 to constrain reverse articulation and control vertical misalignment of the cutting drive links. With respect to the cutting drive link, mating surfaces 846*a*-*b* prevent/reduce upward translation and contact at portions 822*a*-*b* between cutting element 814 and tie strap 802 prevent/reduce downward translation. The reverse is also true. In embodiments, the mating surface 846*a* of a drive link extend over the mating surface 846*b* of an adjacent drive link, for example at an angle of between about 10° and 80°, such as between about 30° and about 60° or about 45°. The extensions of the mating surfaces serves to both constrain reverse articulation and control vertical misalignment of the cutting drive links, for example to enhance the chain stability. In some embodiments, the extensions of the mating surfaces provide a desired translational constraint along with sufficient cross-sectional area between contact surfaces to minimize material deformation and burrs due to impact loading.

The mating surfaces 846*a*-*b* may be included as an alternative to or in addition to the limiting features 124 of the abrasive saw chain 100 discussed above and mating surfaces 236*a*-*b* of the abrasive saw chain 200 discussed above. However, in some cases, the mating surfaces 846*a*-*b* may form a raised burr from impact loading during articulation. Accordingly, in some embodiments, as shown in FIGS. 8A and 8B, the tie straps 802 may include a relief gullet 838 that is aligned with the mating surfaces 846*a*-*b* to accommodate the raised burr.

In some embodiments, the tie strap 802 may include a chamfer on the upper portion of the inside side edge. The chamfer may provide a relief angle to facilitate laser welding of the cutting element 814 to the cutting drive link 804. For example, the chamfer on the tie strap 802 may provide a relief angle to allow for clearance should the laser weld between the cutting element 814 and the cutting drive link 804 protrude slightly beyond the first side or the second side of the drive link. The tie strap 802 may include a chamfer on one or both inside side edges.

In some embodiments the cutting drive link 804 may include chamfers on one or both top edges of the cutting drive link 804. The chamfers may provide a relief angle to facilitate laser welding of the cutting drive link 804. For example, the chamfers may provide a relief angle to prevent or reduce the amount that the laser weld may protrude beyond the first side and/or second side of the drive link. In some embodiments, the chamfers may extend the length of the top edges of the cutting drive link 804.

Figure 9A:
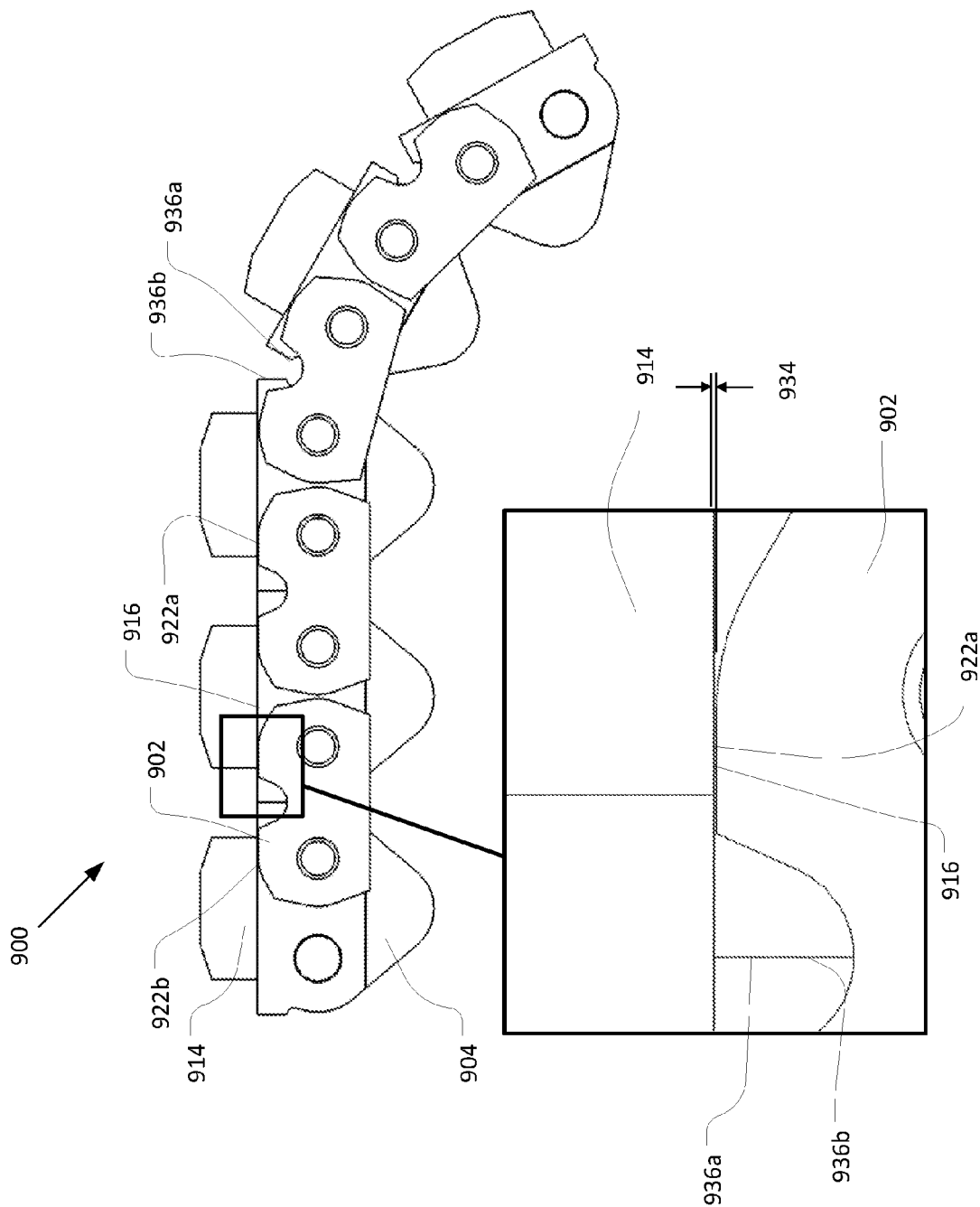
FIG. 9A illustrates a side view and inset view of another abrasive saw chain, in accordance with various embodiments.
Figure 9B:
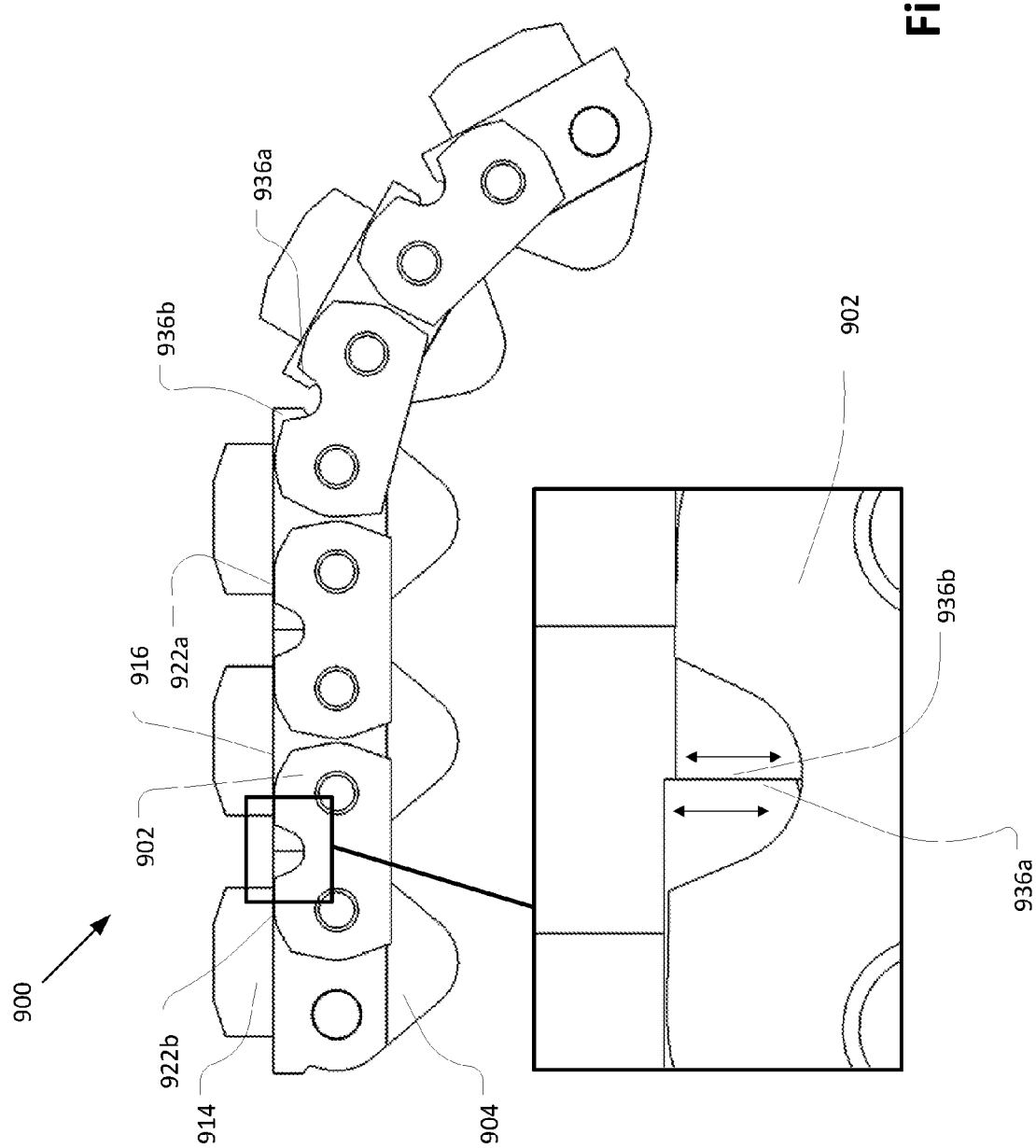
FIG. 9B illustrates a side view and inset view of the abrasive saw chain shown in FIG. 9A, in accordance with various embodiments.

FIGS. 9A and 9B is a side view of an abrasive saw chain, in accordance with various embodiments. The side view and the inset in FIG. 9A illustrate a segment of an abrasive chain 900 depicting load sharing contact of a tie strap 902 with a cutting element 914. The side view and the inset in FIG. 9B illustrate a segment of an abrasive chain 900 depicting upward/downward translation of drive links 904 that enables contact between the bottom side of a cutting element 914 and the top profile of tie strap 902. In the embodiment shown, the abrasive saw chain 900 includes tie straps 902 and drive links 904 coupled to one another via respective rivet holes. The other tie straps may be opposite the tie straps 902 and may be coupled with the drive links 904 and tie straps 902 via respective rivets. In various embodiments, the abrasive saw chain 900 may further include cutting elements 914 coupled to an upper surface 916 of the cutting drive links 904. However, the bottom surface of the cutting elements 914 may not be bonded to the upper surface of the tie straps 902 (e.g., by the welding process).

In various embodiments, the drive links 904 may include mating surfaces 936*a* and 936*b* that contact the respective mating surface 936*a-b* of the adjacent drive links, for example, when the drive links 904 traverse the elongate portion of the guide bar. The mating surfaces 936*a-b* may be separated from (e.g., not in contact with) the respective mating surface 936*a-b* when the drive links 904 are traversing the sprocket. The mating surfaces may prevent and/or reduce reverse articulation and/or other unwanted movement of the drive links when the drive links 904 exit the sprocket and while traversing the elongate portion of the guide bar. In embodiments there may be a clearance 934, such as a clearance of 0.001 inches to 0.010 inches to aid chain assembly and facilitate contact for load sharing, between the upper surface of the tie straps 902 and the bottom surface of the cutting elements 914 when the drive links 904 traverse the elongate portion of the guide bar. The portions 922*a-b* of the upper surface may provide support for load sharing between the cutting elements 914, the drive links 904, and the tie straps 902 to distribute the load on the cutting elements 914 across multiple links, and in particular when mating surfaces 936*a* and 936*b* are in contact, such as when the drive links 904 traverse the elongate portion of the guide bar. The mating surfaces 936*a-b* may be included as an alternative to or in addition to the limiting features 124 of the abrasive saw chain 100 discussed above, mating surfaces 236*a-b* of the abrasive saw chain 200, and mating surfaces 846*a-b* of the abrasive saw chain 800 discussed above.

In some embodiments, the tie strap 902 may include a chamfer on the upper portion of the inside side edge. The chamfer may provide a relief angle to facilitate laser welding of the cutting element 914 to the cutting drive link 904. For example, the chamfer on the tie strap 902 may provide a relief angle to allow for clearance should the laser weld between the cutting element 914 and the cutting drive link 904 protrude slightly beyond the first side or the second side of the drive link. The tie strap 902 may include a chamfer on one or both inside side edges.

In some embodiments the cutting drive link 904 may include chamfers on one or both top edges of the cutting drive link 904. The chamfers may provide a relief angle to facilitate laser welding of the cutting drive link 904. For example, the chamfers may provide a relief angle to prevent or reduce the amount that the laser weld may protrude beyond the first side and/or second side of the drive link. In some embodiments, the chamfers may extend the length of the top edges of the cutting drive link 904.

FIGS. 10A and 10B illustrate forward chain articulation. FIG. 10A is a side view of an abrasive saw chain 900 illustrating allowable forward chain articulation, in accordance with various embodiments. FIG. 10B is a side view of a conventional chain illustrating forward chain articulation for comparison. With respect to the abrasive chain shown in FIG. 10A, the minimum bend radius is defined by contact at adjacent corners of the lower surfaces 932*a-b* of adjacent tie straps. The minimum allowable bend radius for forward articulation ranges between about 0.850 inches to about 0.950 inches. A primary benefit of limiting the range of articulation is that tie strap footprint surface area is increased which reduces footprint and guide bar rail wear rates. Reduced wear rates help to maintain stability at chain/bar interface through life. The chain re-enters the guide bar groove from the drive sprocket in a more controlled fashion which results in less impact loading on the guide bar rails and generates less vibration in the cutting system.

Figure 11A:
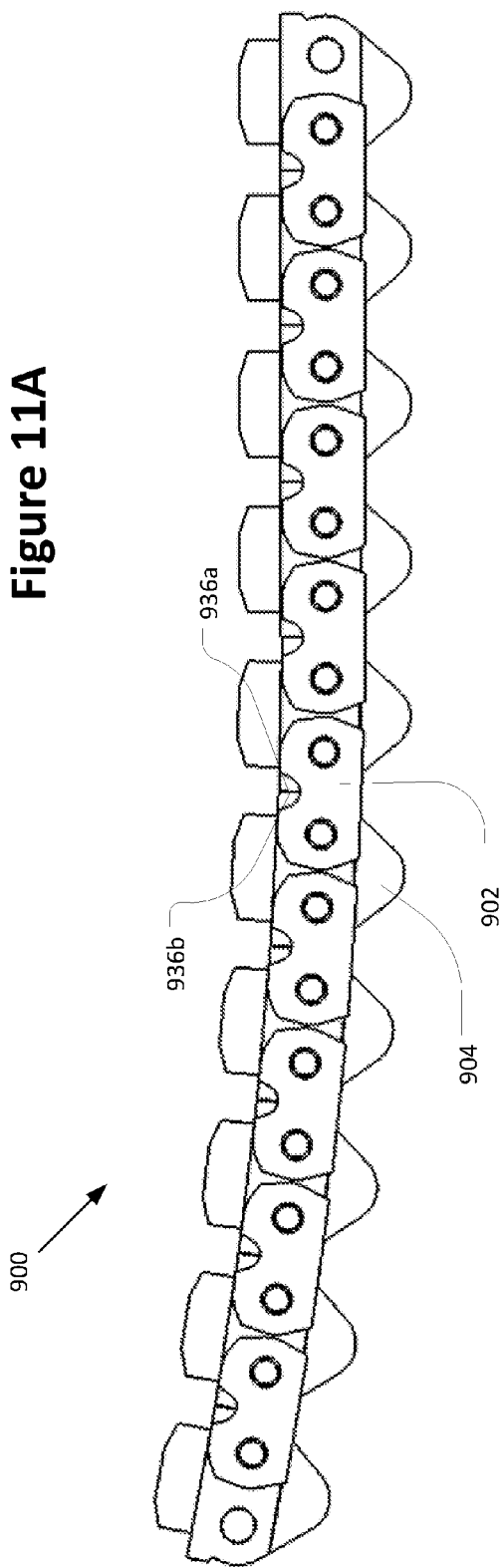
FIG. 11A illustrates a side view of the abrasive saw chain shown in FIG. 9A showing allowable reverse chain articulation, in accordance with various embodiments.
Figure 11B:
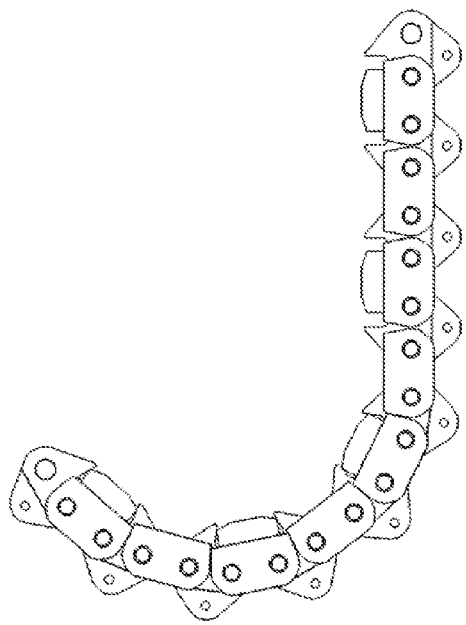
FIG. 11B illustrates a side view of a conventional chain showing allowable reverse chain articulation.

FIGS. 11A and 11B illustrate reverse articulation. FIG. 11A is a side view of an abrasive saw chain 900 illustrating allowable reverse chain articulation, in accordance with various embodiments. FIG. 11B is a side view of a conventional chain illustrating reverse chain articulation for comparison. With respect to the abrasive chain shown in FIG. 11A, contact of the mating surfaces 936*a-b* of adjacent tie drive links inhibits reverse articulation of the abrasive chain 900. Reduced reverse articulation enables cutting loads acting on diamond segments to be distributed evenly across multiple chassis components. In addition reduced reverse articulation provides greater stability and reduces vibration which extends the life of the diamond segments. Reduced reverse articulation increases guide bar life by spreading wear across more guide bar rail area, prevents unwanted motion of the chain in the cut so the diamond segments maintain consistent and stable contact with the workpiece. On elongate portion of guide bar rails, the chain acts more rigidly which promotes cutting efficiency and smoothness. A minimum allowable bend radius for reverse articulation is greater than 25 inches is defined by contact between bottom side of segments and upper profile of tie straps, and between adjacent drive links.

Figure 12:
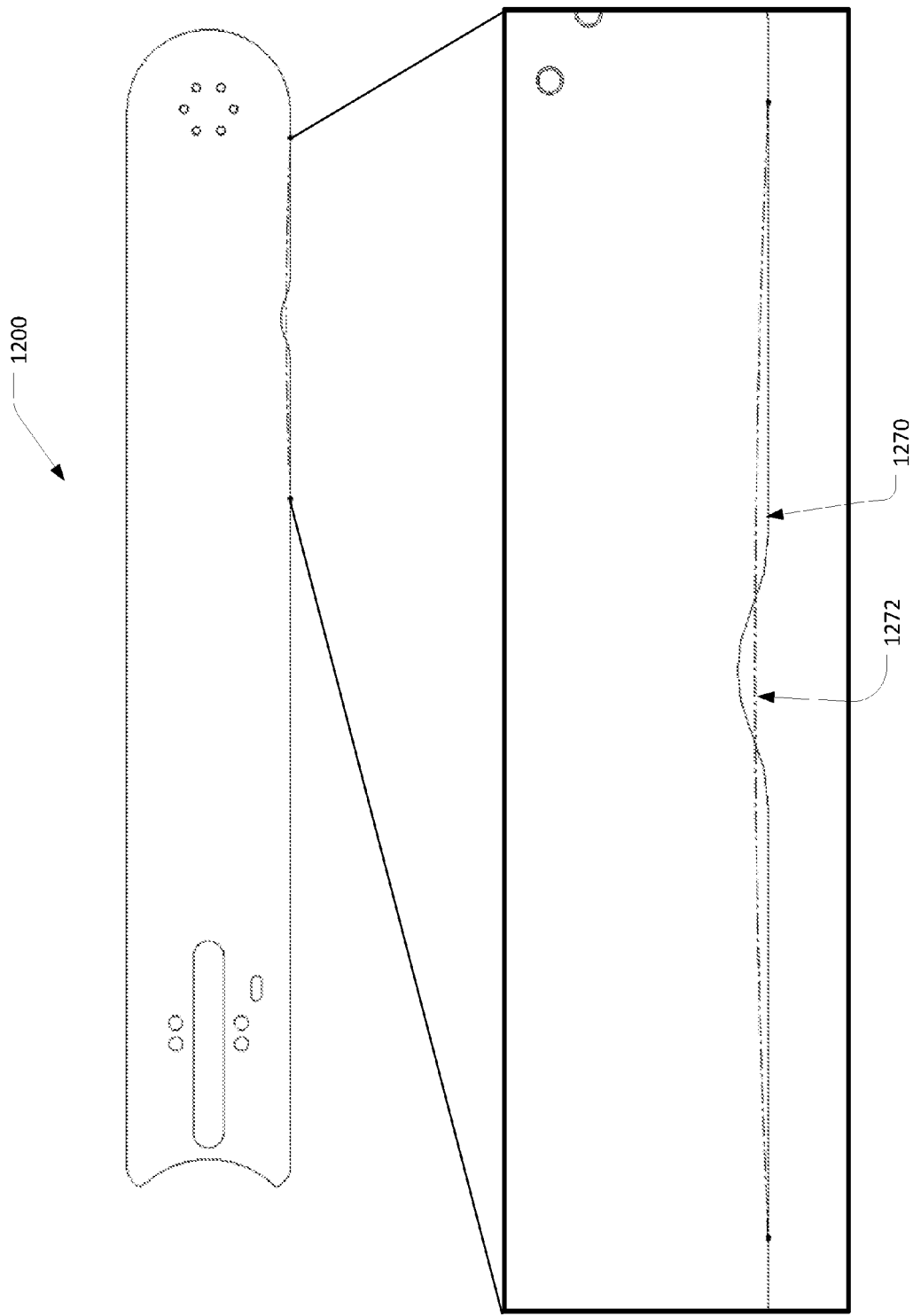
FIG. 12 illustrates guide bar wear patterns for conventional (solid line) and abrasive chain disclosed herein (dashed line).

FIG. 12 illustrates guide bar 1200 wear patterns from conventional chain and abrasive chain disclosed herein. As best seen in the inset, convention chain, in which forward and reverse articulation are not limited results in deep concentrated wear patterns on the guide bar rails 1270 (solid line), which decreases the usable life time of the guide bar 1200. These localized areas of high bar rail wear may be due to heat and loads generated in rebar cutting. In contrast, using a disclosed chain in which the forward and reverse articulation is limited results in a more even rail wear pattern 1272 (dashed line) in which the wear is distributed along the guide bar 1200. Bar rail wear from rebar is evenly distributed across more rail surface area, extending the life of the guide bar 1200. This distribution of the wear provides the guide bar 1200 increased chain stability through life with longer usable life, thereby increasing cutting efficiency and reducing costs to the consumer.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An abrasive saw chain comprising:
a drive link including an upper surface;
a cutting element coupled to the upper surface of the drive link, the cutting element having a lower surface extending across a width of the abrasive saw chain, the cutting element configured to cut aggregate material or pipe; and
a tie strap coupled to the drive link, the tie strap including an upper surface to contact and support the lower surface of the cutting element when the tie strap and the drive link are under load substantially perpendicular to a long axis of the tie strap, wherein there is a gap between the upper surface of the tie strap and the lower surface of the cutting element when the tie strap and the drive link are not under load substantially perpendicular to a long axis of the tie strap and wherein the upper surface of the tie strap contacts the lower surface of the cutting element when the tie strap and the drive link are under load substantially perpendicular to the long axis of the tie strap.

2. The abrasive saw chain of claim 1, wherein the drive link is a first drive link and the cutting element is a first element, and wherein the abrasive saw chain further includes:
a second drive link coupled to the first drive link by the tie strap, wherein the first drive link includes a mating surface that contacts a mating surface of the second drive link when the first and second drive links traverse an elongate portion of a guide bar, thereby preventing reverse articulation of the abrasive saw chain below a minimum radius of 20 inches.

3. The abrasive saw chain of claim 2, wherein the tie strap includes a relief gullet that overlaps with the mating surfaces of the first and second drive links.

4. The abrasive saw chain of claim 2, wherein the second drive link comprises a second cutting element coupled to the upper surface of the drive link, the cutting element having a lower surface extending across a width of the abrasive saw chain, the cutting element configured to cut aggregate material or pipe.

5. The abrasive saw chain of claim 2, wherein the second drive link comprises one or more bumpers.

6. The abrasive saw chain of claim 5, wherein the mating surfaces are perpendicular to a long axis of the guide bar.

7. The abrasive saw chain of claim 5, wherein the mating surface of the second drive link extends over the mating surface of the first drive link to control vertical misalignment of the first drive link.

8. The abrasive saw chain of claim 1, wherein the tie strap includes a limiting feature to contact a front and/or back surface of the cutting element when the tie strap and the drive link traverse an elongate portion of a guide bar, thereby preventing reverse articulation of the abrasive saw chain below a minimum radius of 20 inches.

9. The abrasive saw chain of claim 8, wherein the drive link is a first drive link and the cutting element is a first element, and wherein the abrasive saw chain further includes:
a second drive link coupled to the first drive link by the tie strap; and
a second cutting element coupled to an upper surface of the second drive link;
wherein the limiting feature is further to contact a front and/or back surface of the second cutting element when the tie strap and the first and second drive links traverse the elongate portion of the guide bar.

10. The abrasive saw chain of claim 1, wherein the tie strap is a first tie strap and wherein the abrasive saw chain further includes:
a second tie strap coupled to the first tie strap by the drive link;
wherein a corner defined by a bottom surface and front surface of the first tie strap is disposed less than 0.02 inches from a corner of the second tie strap defined by a bottom surface and rear surface of the second tie strap when the first and second tie straps traverse a sprocket of a guide bar.

11. The abrasive saw chain of claim 10, where contact between the corner of the first tie strap and the corner of the second tie strap limit forward articulation of the abrasive saw chain to a radius greater than 0.800 inches.

12. The abrasive saw chain of claim 1, wherein the aspect ratio of the drive link is between about 1.0 and about 1.15.

13. The abrasive saw chain of claim 1, wherein the aspect ratio of the tie strap is about 0.9 and about 1.02.

14. An abrasive saw chain comprising:
a drive link including an upper surface;
a first tie strap and a second tie strap coupled to the drive link and coupled opposite one another, the first and second tie straps including respective upper surfaces;
a cutting element configured to cut aggregate material or pipe and extending across a width of the abrasive saw chain and bonded to the upper surfaces of the first and second tie straps, the cutting element having a lower surface, the drive link including an upper surface to contact and support the lower surface of the cutting element when the first and second tie straps and the drive link are under load substantially perpendicular to a long axis of the first or second tie strap, wherein there is a gap between the upper surface of the drive link and the lower surface of the cutting element when the first and second tie straps and the drive link are not under load substantially perpendicular to a long axis of the first or second tie strap and wherein the upper surface of the drive link contacts the lower surface of the cutting element when the first and second tie straps and the drive link are under load substantially perpendicular to the long axis of the first or second tie strap.

15. The abrasive saw chain of claim 14, wherein the first tie strap includes a mating surface that contacts a mating surface of the second tie strap when the first and second tie straps traverse an elongate portion of a guide bar, thereby preventing reverse articulation of the abrasive saw chain below a minimum radius of 20 inches.

16. The abrasive saw chain of claim 14, wherein a corner defined by a bottom surface and front surface of the first tie strap is disposed less than 0.02 inches from a corner of the second tie strap defined by a bottom surface and rear surface of the second tie strap when the first and second tie straps traverse a sprocket of a guide bar and where the corner of the first tie strap the corner of the second tie strap limit forward articulation of the abrasive saw chain to a radius greater than 0.800 inches.

* * * * *